May 29, 1962  J. M. KATZFEY  3,036,379
GRASS SHEARS
Filed May 1, 1959
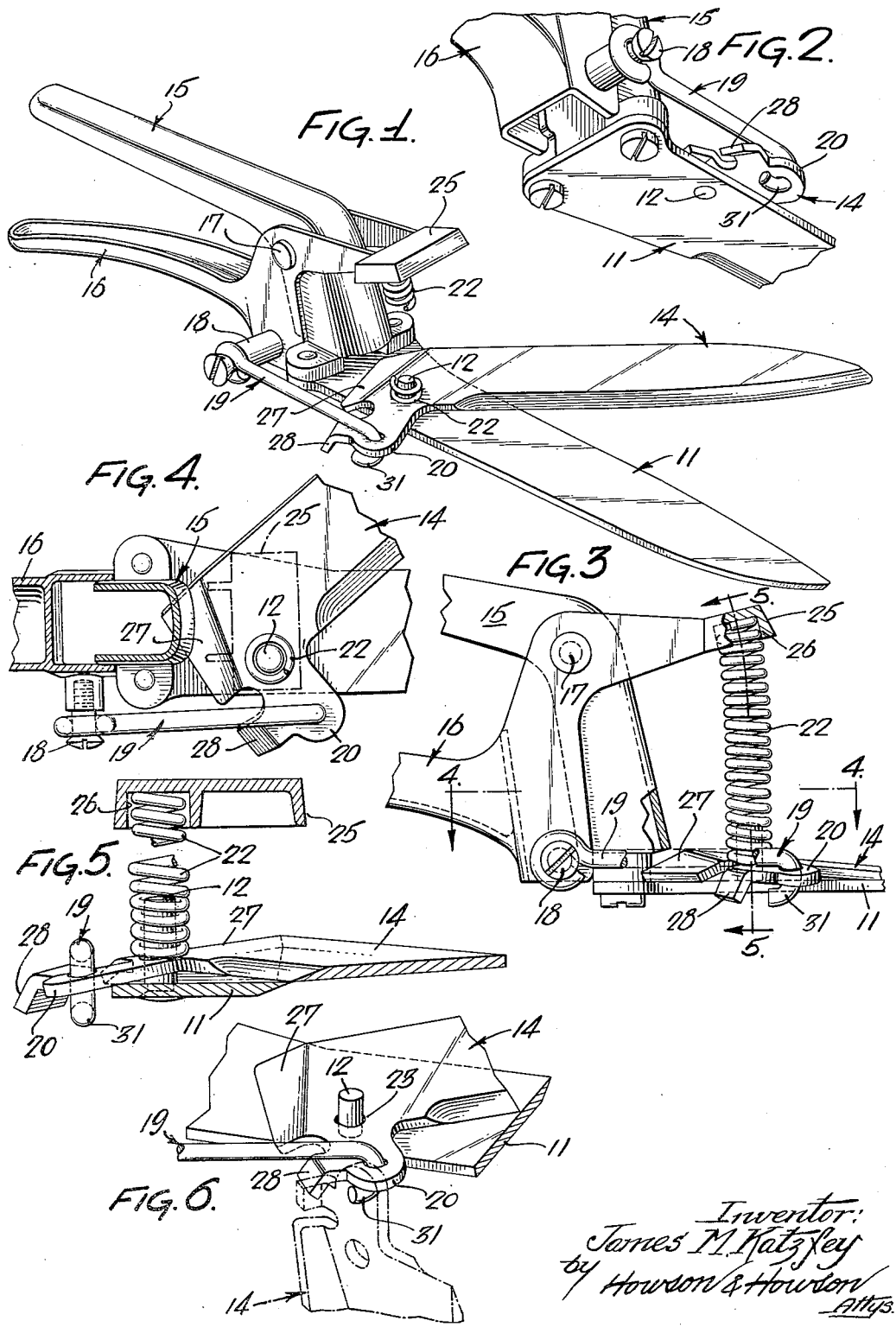
Inventor:
James M. Katzfey
by Howson & Howson
Attys.

United States Patent Office 3,036,379
Patented May 29, 1962

3,036,379
GRASS SHEARS
James M. Katzfey, Willow Grove, Pa., assignor to H. K. Porter Company, Inc., Pittsburgh, Pa., a corporation of Delaware
Filed May 1, 1959, Ser. No. 810,274
6 Claims. (Cl. 30—248)

The present invention relates to grass shears and has particular application to grass shears in which the handle is pivoted for movement about a horizontal pivot to pivotally displace the blades about a vertical pivot.

A primary object of the present invention is to provide grass shears of the stated type having improved structural characteristics and which are fully effective in operation and use.

More specifically, the present invention provides grass shears in which a single spring serves the dual function of biasing the pivotally mounted blades together and biasing the pivotally mounted handles apart.

More particularly, the present invention provides a shears construction in which the blades are releasably mounted so that one of the blades may be separated from the other for ease of sharpening or repair.

The present invention provides a grass shears in which the lowermost horizontal ground-engaging blade is provided with an upstanding stub shaft which is adapted to releasably and slidably engage the upper cooperating blade to pivotally mount the same for displacement about said shaft, said shaft receiving and mounting a helical coil spring which biases the blades together to prevent inadvertent disengagement thereof, but which is displaceable to permit ready disengagement of said blades when desired.

A preferred embodiment of the invention is illustrated in the attached drawings, and the objects of the invention will be more fully set forth hereinafter in conjunction with the description of this embodiment.

In the drawings:

FIG. 1 is a view in perspective of grass shears made in accordance with the present invention;

FIG. 2 is a fragmentary perspective view of the under surface of the shears shown in FIG. 1;

FIG. 3 is a fragmentary view in side elevation of the operating connection embodied in the shears;

FIG. 4 is a fragmentary sectional view taken on the line 4—4 of FIG. 3;

FIG. 5 is an enlarged fragmentary sectional view taken on the line 5—5 of FIG. 3; and FIG. 6 is a fragmentary perspective view showing the operation of the shears for removal of the upper blade.

Referring to the drawing, the shears of the present invention comprises a lower ground-engaging blade 11 having adjacent its rearward end an upstanding stub shaft 12 which pivotally mounts the cooperating upper blade 14. Beyond the stub shaft 12, the lower blade 11 rigidly mounts a fixed handle element 15 which pivotally mounts thereon a movable handle element 16 as indicated at 17. The movable element 16 has an outstanding pin 18 which pivotally supports a connecting rod 19 extending at its opposite end into engagement with a projecting ear 20 on the removable blade 14, whereby upon closing movement of the handle elements 15 and 16, the blades 11 and 14 close to provide a shearing action. The rearward terminal portion of the blade 14 is provided with a downturned cam surface 27 which rides on the lower blade 11 and serves to fulcrum the blade 14 into engagement with the blade 11 along the cutting edge as the blade 14 is displaced into overlying relation with the blade 11. A downturned lug is provided at 28 to engage the side edge of the blade 11 and limit the closing movement of the blade 14 relative thereto.

In accordance with the invention, a single spring 22 operates to bias the blades 11 and 14 into shearing engagement and also operates to bias said handle elements 15 and 16 into open position whereby upon gripping the handle elements 15 and 16 to close the same, the spring 22 is compressed to exert greater bias urging the blade 14 into engagement with the blade 11. To this end, the blade 14 is provided with an aperture 23 (see FIG. 6) which is freely slidable on the stub shaft 12, its marginal portion forming a seat for the lower end of the spring 22 which is held against lateral displacement by telescopic engagement with the stub shaft 12. A seat for the upper end of the spring 22 is provided in an offset leg 25 extending from the movable handle 16 and providing a cupped recess 26 receiving the upper end of the spring.

In accordance with another feature of the invention, the construction of the shears affords simple removal of the blade 14 from the blade 11 for purposes of sharpening or repair. To this end, the upper portion of the stub shaft 12 is smaller than the aperture 23 so that upon removal of the spring 22, the blade may be slidably disengaged from the stub shaft 12. The blade may be pivoted on the connecting rod 19 to the position shown in broken lines in FIG. 6 and by reason of the hooked form of the connecting rod shown at 31, the blade may be disengaged from the forward end of the connecting rod and thereby removed entirely from the lower blade 11 and the associated handle portions 15 and 16 connected thereto. Thus, removal of the blade 14 is accomplished without the necessity for removing screws, and the like which may become frozen or rusted in place after prolonged periods of use.

The present invention therefore provides an improved grass shears of simplified mechanical design by reason of the provision of a single spring serving the dual purpose of urging the shearing blades together and urging the actuating handles apart. In addition, the construction affords ready separation of the blades so that the entire cutting edge of each blade may be sharpened along its entire length on a girnding wheel or other suitable sharpening equipment.

While a particular embodiment of the present invention has been herein illustrated and described, it is not intended to limit the invention to such disclosure, but changes and modifications may be made therein and thereto within the scope of the following claims.

I claim:

1. Grass shears comprising a horizontal blade terminating at its rear end in an upwardly and rearwardly extending primary handle rigidly connected thereto, a complementary handle pivotally connected to said primary handle for pivotal movement about a substantially horizontal pivot, an upstanding stub shaft on said lower blade disposed forwardly of said primary handle, a blade having an aperture slidably engaged on said upstanding stub shaft for pivotal movement thereabout in shearing cooperation with said lower blade, connections between said pivoted blade and said complementary handle to operate the blades to closing position upon closing movement of said handles, said pivoted handle having an extension projecting forwardly into overlying relation with said stub shaft and forming downwardly-facing seat, a cylindrical spring compressed between said seat and the upper surface of said pivoted blade and operable to bias said handle portions towards open position and simultaneously bias said upper and lower blades toward one another, whereby upon closing movement of said handles, the biasing force of said spring increases the force engaging said upper and lower blades.

2. Apparatus according to claim 1 wherein said spring seats at its lower end against the marginal portion of said aperture and telescopically engages the upstanding stub shaft.

3. Apparatus according to claim 2 wherein said stub shaft is smaller than said aperture in the upper blade whereby said upper blade may be removed from said lower blade by displacement over the end of said stub shaft upon removal of said spring.

4. Apparatus according to claim 1 wherein said connections between said pivoted handle and said movable blade include a connecting rod having a hook at one end engaged with said pivoted upper blade whereby said blade may be completely disassociated from said lower blade upon disengagement thereof from said stub shaft by unhooking said blade from said hook.

5. Shears comprising a main section having a handle and a stationary blade rigidly connected at one end thereof to said handle, a movable blade overlying said stationary blade and having an opening therein, a pivot stud fixed on said stationary blade and projecting upwardly therefrom loosely through said opening in the movable blade, said blades having cooperative cutting edges, an operating handle pivotally mounted intermediate its ends on said main section with one end portion overhanging said fixed stud, means connecting said operating handle to the movable blade for swinging said movable blade relative to the stationary blade, and means including a coil spring interposed between said movable blade and said end of the operating handle biasing the latter in one direction holding said movable blade on said fixed stud, and yieldingly pressing the movable blade against the stationary blade.

6. Grass shears comprising a stationary blade terminating at its rear end in an upwardly and rearwardly extending primary handle rigidly connected thereto, a complementary handle pivotally connected to said primary handle for pivotal movement about a substantially horizontal pivot toward and away from the primary handle, an upstanding pivot stud fixed with respect to said stationary blade forwardly of said primary handle, a movable blade having an aperture engaged on said upstanding pivot stud for pivotal movement thereabout in overlying shearing cooperation with said stationary blade, connections between said movable blade and said complementary handle to operate the blades to closing position upon closing movement of said handles, said complementary handle having an extension projecting forwardly into overlying relation with said pivot stud and forming downwardly-facing seat, a coil spring having its upper end in engagement with said downwardly-facing seat and its lower end embracing the fixed pivot stud, said spring being operable to bias said handle portions to open position and engage the movable blade firmly upon the stationary blade with increasing pressure upon closing movement of the handles, said pivot stud being smaller than the aperture in the movable blade so that the stud passes loosely therethrough for removal of the movable blade upon removal of said spring, and said spring in the open position of the handles constituting the sole biasing means holding the movable blade on said fixed stud and in engagement with the stationary blade.

No references cited.